Figures 1, 2:
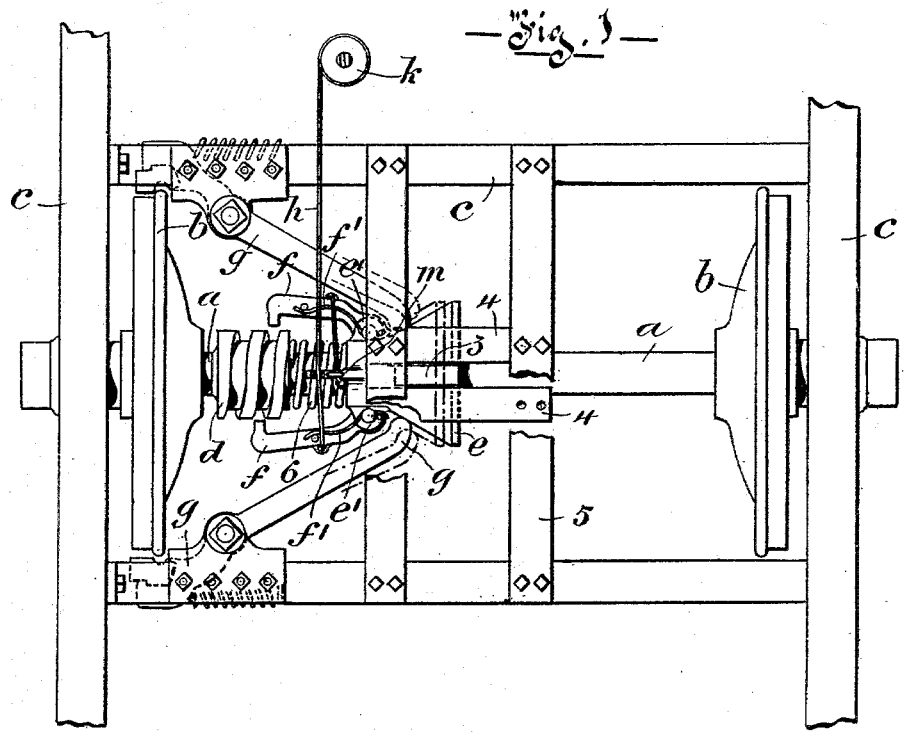

(No Model.)

J. P. MARTIN.
CAR BRAKE.

No. 548,648. Patented Oct. 29, 1895.

Witnesses                    Inventor
                             James P. Martin
                             By his Attorney

UNITED STATES PATENT OFFICE.

JAMES PHILIP MARTIN, OF MONTREAL, CANADA, ASSIGNOR OF TWO-THIRDS TO ENOCH JAMES AND FRANK GORMLEY, OF SAME PLACE.

CAR-BRAKE.

SPECIFICATION forming part of Letters Patent No. 548,648, dated October 29, 1895.

Application filed November 14, 1894. Serial No. 528,768. (No model.)

*To all whom it may concern:*

Be it known that I, JAMES PHILIP MARTIN, commercial traveler, of the city of Montreal, in the district of Montreal and Province of Quebec, Canada, have invented certain new and useful Improvements in Car-Brakes; and I do hereby declare that the following is a full, clear, and exact description of the same.

This invention relates to brakes more especially applicable to street-cars and the like, and has for its object to secure a very rapid action with but little exertion on the part of the driver or motorman, since the power required is derived from the rotating axle of the car itself.

The invention consists of one or a pair of levers fulcrumed adjacent to the car-wheel and having their outer ends adapted to be pressed upon the tread itself, a wedge or cone movable along the axle being thrown between the inner ends of the levers by means of a worm on the axle, into mesh with which an engaging device carried by the cone is moved by the motorman or driver through any suitable connection, the rotation of the axle, and with it the worm, serving through the engaging device to move the wedge forward between the inner ends of the levers, thus clamping their outer ends upon the wheel-tread and stopping the car, and any suitable means being used to return the wedge to its normal position. For full comprehension, however, of the invention, reference must be had to the annexed drawings, forming a part of this specification, in which like symbols indicate corresponding parts, and wherein—

Figure 1 is a plan view of the truck of a street-car, showing my improved brake applied to one of the wheels thereof; and Fig. 2 a side elevation of same.

While in practice the brake device will be applied to each wheel of the car, yet I do not consider it necessary for the purpose of this application to illustrate more than one device, as the rest are merely duplicates of the one shown.

*a* is one of the axles of a street-car, *b* the wheel thereon, and *c* the truck-frame.

Upon the axle, near the wheels, I mount and secure rigidly in place, by welding or otherwise, a worm-sleeve *d*, and about centrally of the axle a movable wedge-block *e*, preferably in the form of a truncated cone, is freely mounted with its truncated end facing the wheel. This wedge-block carries an engaging device for temporarily connecting it with the thread of the worm, which device is preferably in the form of one or more fingers *f*, loosely pivoted at one end to lugs *e'* on the forward end of the block *e*, and having their free bent ends normally held out of engagement with the worm by a spring or springs *f'*, carried by the hub of the block and bearing beneath pin projections from the side the finger or fingers. To prevent the wedge-block rotating with the axle, I prefer to form an upwardly-projecting rib or arm 3 on its side, which is adapted to work in any suitable guides 4, carried by framework 5, or the ends of the levers could enter grooves in the block and so prevent it rotating. The wedge-block is also preferably returned to its normal position by means of a coiled expansion-spring 6, encircling the axle between and bearing at either end upon the worm-sleeve *d* and the wedge-block *e*.

*g g* are a pair of levers fulcrumed at *g'*, between the wheel and the wedge-block, to the truck-frame and having their outer ends formed similarly to brake-shoes, so as to adapt them for application to the wheel-tread, the normal position of such ends with relation to the wheel-tread being also similar to that of the ordinary brake-shoe, while their inner ends are located in a position to be acted upon by the wedge-block, as will now be described.

By means of any suitable connection, such as a wire rope *h*, leading from a winding-drum *k*, rotated by the motorman to the engaging-fingers *f*, around the outside of which it is passed or encircled and its end secured by any suitable stationary eye or projection *m* from the wedge-block, such engaging finger or fingers is or are pressed into engagement with the worm on the shaft, and this latter continuing in its rotation naturally causes, through the worm and the engaging-fingers, the wedge-block to be moved in the direction of the wheel, thus forcing the inner ends of the levers apart and consequently clamping their outer ends upon the wheel sufficiently to stop the car.

By the arrangement just described it will be apparent that the manual force necessary to apply the brake is reduced to what is required to place the engaging-fingers in mesh with the worm, the rest of the work being performed automatically by the rotating axle of the car.

What I claim is as follows:

1. In a car brake, the combination of one or more levers fulcrumed adjacent to the car wheel and having ends adapted to be pressed upon the tread thereof, a movable wedge-block mounted on the axle, and adapted to operate such lever or levers, and the axle carrying a worm, with means for effecting an engagement of the wedge block with the worm and for returning the block to its normal position, for the purpose set forth.

2. In a car brake, the combination of one or more levers fulcrumed adjacent to the car wheel and having outer ends adapted to be pressed upon the tread thereof, a wedge block mounted on the axle and adapted to operate such lever or levers by bearing upon the inner end or ends thereof, a worm rigidly carried by said axle, an engaging device carried by the wedge block for effecting an engagement between the block and the worm means for returning the block to its normal position and a suitable connection under control of the motorman for moving such engaging device into mesh with the worm for the purpose set forth.

3. In a car brake, the combination of one or more levers fulcrumed adjacent to the car wheel and having outer ends adapted to be pressed upon the tread thereof, a movable wedge block in the form of a truncated cone mounted to slide on the axle and adapted to operate such lever or levers by bearing upon the inner end or ends thereof, means for preventing the rotation of the block with the axle, a worm rigidly carried by said axle, an engaging device in the form of a pivoted finger with spring for keeping it normally in disengaged position, carried by the wedge block for effecting an engagement between the block and the worm, means for returning the block to its normal position and a suitable flexible connection, under control of the motorman, for bearing upon and moving such engaging device into mesh with the worm for the purpose set forth.

Montreal, 5th day of October, 1894.

JAMES PHILIP MARTIN.

In presence of—
 FRED J. SEARS,
 R. A. C. KIMBER.